(12) United States Patent
Baba

(10) Patent No.: US 12,126,777 B2
(45) Date of Patent: Oct. 22, 2024

(54) IMAGE FORMING SYSTEM THAT FORMS IMAGES ON VARIOUS TYPES OF SHEETS AND CONTROLS WHETHER OR NOT TO PERFORM PRINTING BASED ON DETECTION RESULTS INDICATING A SHEET DESIGNATED IN A JOB IS A DIFFERENT TYPE THAN THE SHEET TYPE DETECTED BY A SENSOR

(71) Applicant: CANON KABUSHIKI KAISHA, Tokyo (JP)

(72) Inventor: Tomoki Baba, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/959,451

(22) Filed: Oct. 4, 2022

(65) Prior Publication Data
US 2023/0115344 A1 Apr. 13, 2023

(30) Foreign Application Priority Data
Oct. 11, 2021 (JP) .................................. 2021-166919

(51) Int. Cl.
*H04N 1/00* (2006.01)
*G06F 3/12* (2006.01)
*H04N 1/23* (2006.01)

(52) U.S. Cl.
CPC ....... *H04N 1/2376* (2013.01); *H04N 1/00716* (2013.01); *H04N 1/00726* (2013.01)

(58) Field of Classification Search
CPC ........... H04N 1/00716; H04N 1/00726; H04N 1/2376; G06F 3/1208; G06F 3/121; G06F 3/1232; G06F 3/1253; G06F 3/1255; G06F 3/1284; G06F 3/1285
USPC ................. 358/1.11–1.18, 1.9, 2.1, 449, 488
See application file for complete search history.

(56) References Cited

U.S. PATENT DOCUMENTS

| 2002/0054322 | A1* | 5/2002 | Geelen | G06F 3/1285 |
| | | | | 358/1.14 |
| 2002/0085186 | A1* | 7/2002 | Sawada | H04N 1/00774 |
| | | | | 358/487 |
| 2007/0296748 | A1* | 12/2007 | Oki | G06F 3/1255 |
| | | | | 347/14 |
| 2015/0246782 | A1* | 9/2015 | Iwami | B65H 3/44 |
| | | | | 271/9.05 |
| 2017/0277098 | A1* | 9/2017 | Yamaoka | G03G 15/6511 |
| 2019/0158680 | A1* | 5/2019 | Ueda | H04N 1/00697 |

(Continued)

FOREIGN PATENT DOCUMENTS

JP 2017-170858 A 9/2017

*Primary Examiner* — Chad Dickerson
(74) *Attorney, Agent, or Firm* — VENABLE LLP

(57) ABSTRACT

An image forming apparatus includes a transporter to transport a sheet in a transport path, an image forming assembly to form an image on the sheet transported by the transporter, and a sensor to detect the sheet in the transport path. In addition, a controller obtains user designation information indicating a type of a sheet onto which an image is to be formed before the sensor detects the sheet, and controls the image forming unit to skip forming the image on the sheet if a condition for permitting image formation is not satisfied, in a case where a detecting result from the sensor indicates a type different from the type indicated by the user designation information.

12 Claims, 15 Drawing Sheets

(56) References Cited

U.S. PATENT DOCUMENTS

2019/0265607 A1\* 8/2019 Ishimoto ............ G03G 15/6594
2020/0130971 A1\* 4/2020 Kawabata .......... G03G 15/5029
2022/0185615 A1\* 6/2022 Takahashi .......... G03G 15/5029

\* cited by examiner

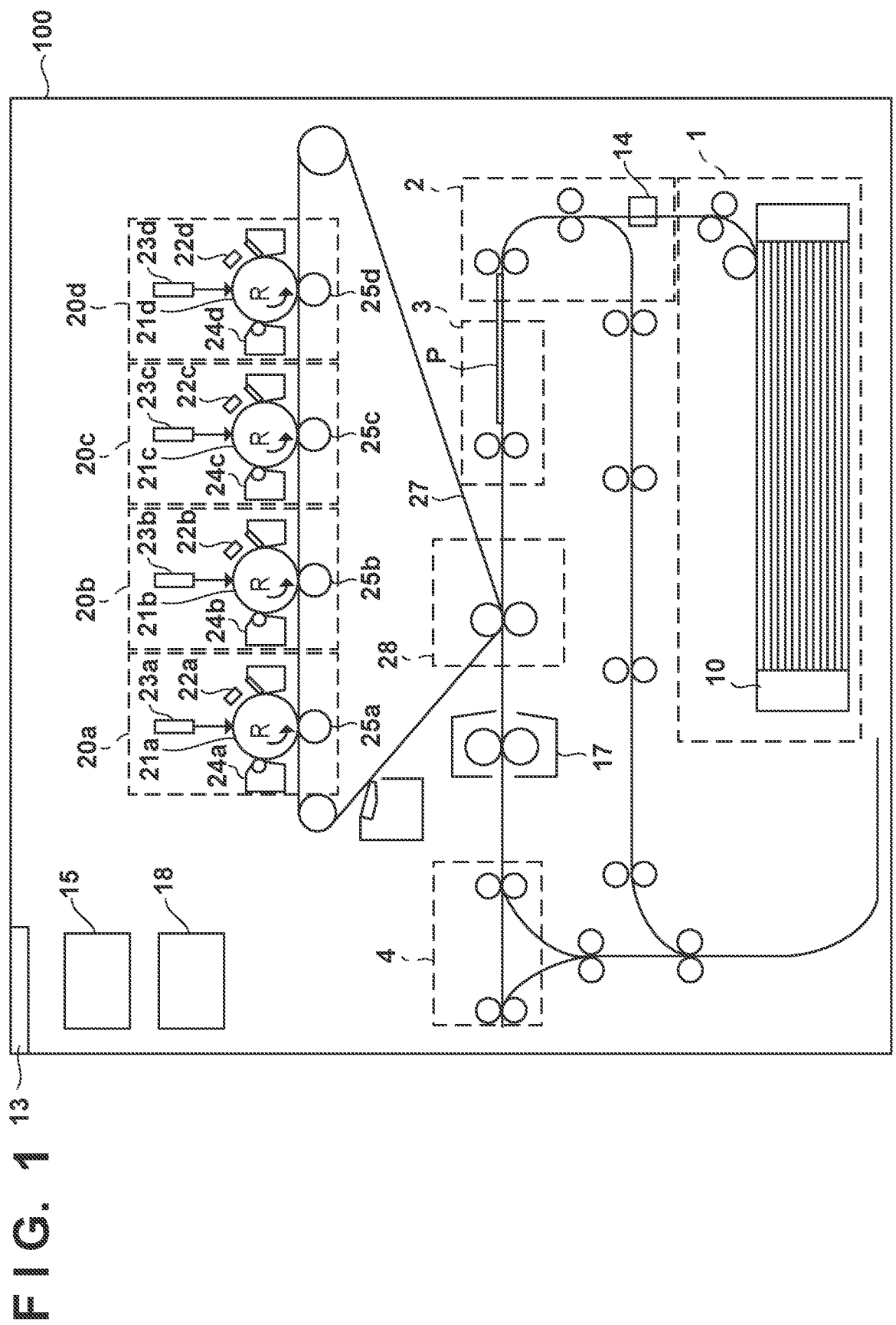
F I G. 1

FIG. 12A 1200

| USER NAME | USER ID | PRINT PERMISSION CONDITION |
|---|---|---|
| USER A | 12345 | CARDBOARD, STANDARD PAPER, THIN PAPER |
| USER B | 67890 | STANDARD PAPER |
| — | — | — |

FIG. 12B 1210

| MODEL ID | PRINT PERMISSION CONDITION |
|---|---|
| MODEL A | CARDBOARD, STANDARD PAPER, THIN PAPER |
| MODEL B | STANDARD PAPER |
| — | — |

FIG. 12C 1220

| INSTALLATION LOCATION INFORMATION | PRINT PERMISSION CONDITION |
|---|---|
| FLOOR A | CARDBOARD, STANDARD PAPER, THIN PAPER |
| FLOOR B | STANDARD PAPER |
| — | — |

FIG. 12D 1230

| TIME INFORMATION | PRINT PERMISSION CONDITION |
|---|---|
| 2022/01/01-2022/01/31 | CARDBOARD, STANDARD PAPER, THIN PAPER |
| 2022/05/01-2022/05/31 | STANDARD PAPER |
| — | — |

IMAGE FORMING SYSTEM THAT FORMS IMAGES ON VARIOUS TYPES OF SHEETS AND CONTROLS WHETHER OR NOT TO PERFORM PRINTING BASED ON DETECTION RESULTS INDICATING A SHEET DESIGNATED IN A JOB IS A DIFFERENT TYPE THAN THE SHEET TYPE DETECTED BY A SENSOR

BACKGROUND OF THE INVENTION

Field of the Invention

The present invention relates to an image forming apparatus that forms images on various types of sheets.

Description of the Related Art

At present, with various types of sheets being distributed, the type of sheet set by a user through an operation unit may differ from the type of sheet fed from a holding unit. Such sheets are often discarded after the images are formed, resulting in wasteful consumption of resources. Japanese Patent Laid-Open No. 2017-170858 proposes prohibiting sheets from being fed when a sheet of a different type from the type designated by the user is stored in the holding unit by detecting the sheet type using a media sensor.

According to Japanese Patent Laid-Open No. 2017-170858, a user cannot form an image on a sheet unless the user changes the designation of the sheet type or replaces the sheets stored in the holding unit with sheets of the desired type. This results in poor usability. The user may permit the type of sheet designated to differ from the type of sheet actually fed. Therefore, in such cases, the usability should be ensured by continuing to form images even if the sheet types do not match.

SUMMARY OF THE INVENTION

The present disclosure provides an image forming apparatus comprising: a transport unit configured to transport a sheet in a transport path; an image forming unit configured to form an image on the sheet transported by the transport unit; a sensor configured to detect the sheet in the transport path; and a controller configured to: obtain user designation information indicating a type of a sheet onto which an image is to be formed; control the image forming unit to form the image on the sheet in a case where a condition for permitting image formation is satisfied, even when a detecting result from the sensor indicates a type different from the type indicated by the user designation information; and control the image forming unit to skip forming the image on the sheet if the condition is not satisfied, in a case where the detecting result from the sensor indicates a type different from the type indicated by the user designation information.

Further features of the present invention will become apparent from the following description of exemplary embodiments (with reference to the attached drawings).

BRIEF DESCRIPTION OF THE DRAWINGS

FIG. 1 is a cross-sectional view of an image forming apparatus.
FIGS. 12A to 12D are diagrams illustrating various print permission conditions.

DESCRIPTION OF THE EMBODIMENTS

Figure 2:
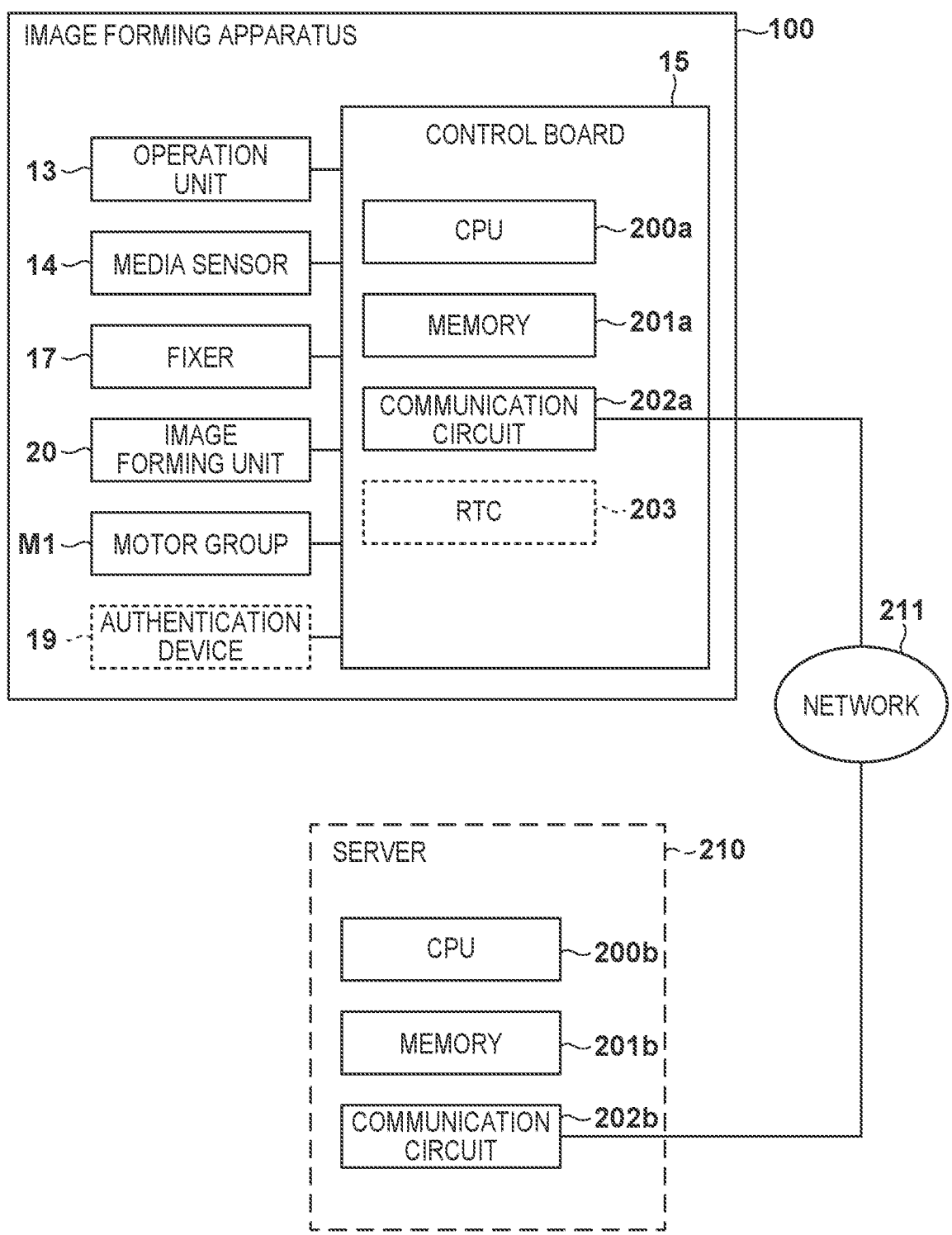
FIG. 2 is a block diagram of an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Image Forming Apparatus

As illustrated in FIG. 1, an image forming apparatus 100 forms an image on a sheet P using the electrophotographic method. However, the image forming apparatus 100 may form images using another image forming method, such as the ink jet method. In other words, the invention according to the present embodiment can be applied to any image forming method that changes image forming conditions according to the type of the sheet P (e.g., the thickness, grammage, presence or absence of gloss, or material (paper/resin)).

A feed device 1 includes feed rollers, and feeds the sheet P held in a holding unit 10 to a transport path (conveyance path). A transport device 2 includes transport rollers, and transports (conveys) the sheet P to a registration device 3. A media sensor 14 that senses the type of the sheet P is provided in the transport path. The registration device 3 includes transport rollers, and corrects skew in the sheet P and transports the sheet P to a secondary transfer nip 28.

Image forming units 20a, 20b, 20c, and 20d form yellow (Y), magenta (M), cyan (C), and black (K) toner images, respectively. In the following, multiple constituent components which are identical or similar will be given the same reference signs. When distinguishing between multiple constituent components, letters are added to the end of the reference signs. When common items are described for multiple constituent components, the letters at the end of the reference signs are omitted.

A photosensitive drum 21 is an image carrier that holds an electrostatic latent image and a toner image. A charger 22 electrically charges the surface of the photosensitive drum 21. An exposure device 23 forms an electrostatic latent image by irradiating the surface of the photosensitive drum 21 with a laser beam corresponding to an image signal. A developer 24 uses toner to develop the electrostatic latent image and forms a toner image. A primary transfer roller 25 transfers the toner image from the photosensitive drum 21 to an intermediate transfer belt 27. The intermediate transfer belt 27 transports the toner image to the secondary transfer nip 28.

The secondary transfer nip 28 is formed by a secondary transfer roller and the intermediate transfer belt 27, and transfers the toner image from the intermediate transfer belt 27 to the sheet P. A fixer 17 fixes the toner image onto the sheet P by applying heat and pressure to the toner image and the sheet P. A discharge device 4 includes transport rollers, and transports and discharges the sheet P onto which the toner image has been fixed to the exterior of the image forming apparatus 100.

A control board 15 operates based on power supplied from a power circuit 18. An operation unit 13 includes a display which displays software keys that accept user inputs, as well as input devices (e.g., a keyboard, switches, buttons, and touch sensors) for inputting user instruction information to instruct printing settings, permission to form images, and the like. Note that the operation unit 13 may be configured including physical keys for inputting user instructions, instead of software keys.

Controller

As illustrated in FIG. 2, the control board 15 includes a CPU 200a, a memory 201a, and a communication circuit 202a. The CPU 200a implements various functions according to a control program stored in a Read-Only Memory (ROM) area of the memory 201a. The memory 201a may further include Random Access Memory (RAM), a Hard Disk Drive (HDD), and a Solid-State Drive (SSD). The communication circuit 202a includes circuitry for executing wired communication or wireless communication. For example, the communication circuit 202a accesses a server 210 over a network 211, and stores information on the server 210 or obtains information (permission signals) from the server 210. A motor group M1 includes motors involved in transporting the sheet P, motors involved in forming images on the sheet P, and drive sources such as solenoids that switch the destination of the sheet P. An authentication device 19 is a device that executes user authentication.

The authentication device 19 may be a card reader that reads a magnetic card or an IC card storing user authentication information. The authentication device 19 may be a biometric reading device that reads biometric information such as fingerprints, a palm, voice, an iris, or a face. An RTC 203 is what is known as a real-time clock, and manages the current date and time.

The CPU 200a sets image forming conditions according to type information indicating the type of the sheet P sensed by the media sensor 14. For example, the CPU 200a changes the fixing temperature of the fixer 17, changes the rotation speed of the motor group M1 (the transport speed of the sheet P), and the like according to the type information. This is because the fixing temperature and transport speed required to ensure proper fixing differ depending on the type of the sheet P. For example, the fixing temperature increases as the grammage of the sheet P increases. Alternatively, the transport speed decreases as the grammage of the sheet P increases. This ensures that the amount of heat supplied to the sheet P is sufficient.

The server 210 is optional. The server 210 includes a CPU 200b, a memory 201b, and a communication circuit 202b. The CPU 200b implements various functions according to a control program stored in a ROM area of the memory 201b. The memory 201b may further include RAM, an HDD, and an SSD. The communication circuit 202b includes circuitry for executing wired communication or wireless communication. The communication circuit 202b receives service requests from the image forming apparatus 100 over the network 211 and transmits corresponding responses and the like. For example, the server 210 transmits, to the image forming apparatus 100, determination conditions and the like necessary for determination processing performed in the image forming apparatus 100. Alternatively, the server 210 may execute the determination processing based on information received from the image forming apparatus 100 and transmit a determination result to the image forming apparatus 100.

Figure 3:
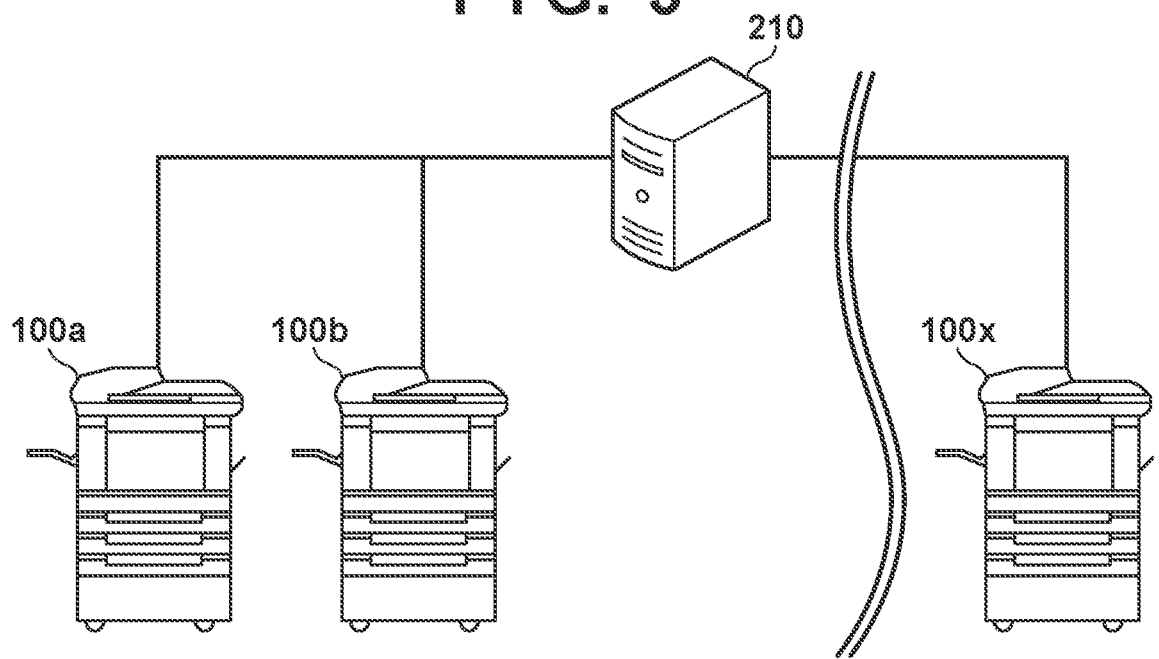
FIG. 3 is a diagram illustrating a plurality of image forming apparatuses connected to a server.

As illustrated in FIG. 3, a plurality of image forming apparatuses 100a to 100x may be connected to the server 210. The server 210 may hold user account information (e.g., a user ID and password) in the memory 201b. "ID" is an acronym of "identification information". The CPU 200b of the server 210 determines whether the account information input from the operation unit 13 matches the account information held in the memory 201b, and transmits the determination result. This may be called "user authentication".

Fixer

Figure 4:
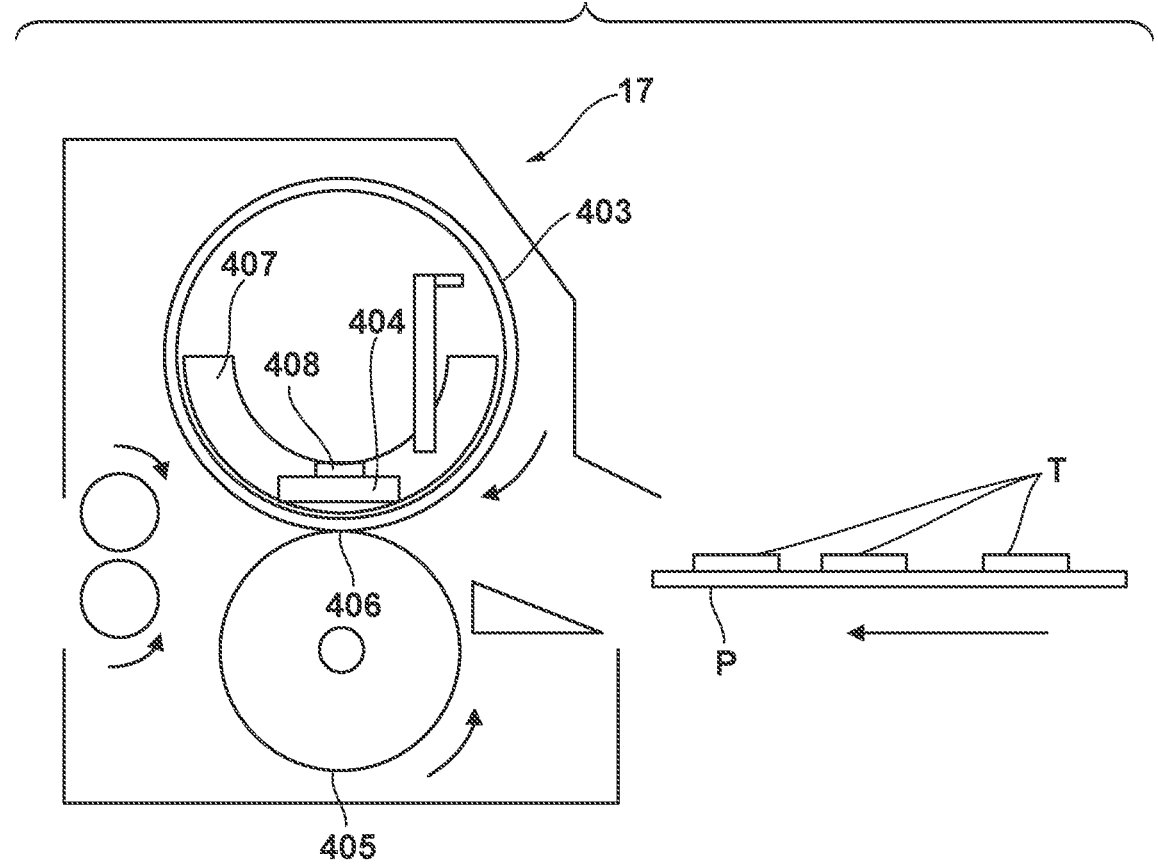
FIG. 4 is a cross-sectional view of a fixer.

FIG. 4 illustrates the structure of the fixer 17. The sheet P carrying toner T is transported from the secondary transfer nip 28 to the fixer 17. A fixing nip 406 is formed by pressure contact between a pressure roller 405 and a fixing film 403, which causes an elastic layer of the fixing film 403 to deform. The pressure roller 405 is driven by the motor group M1 to rotate, and the fixing film 403 also rotates along with the pressure roller 405.

A heater 404 held by a heater holder 407 and a temperature sensor 408 are provided within the fixing film 403. The heater holder 407 is attached by a spring or the like and presses the inner circumferential surface of the fixing film 403 toward the pressure roller 405. The CPU 200a adjusts the power supplied to heater 404 such that the fixing temperature sensed by the temperature sensor 408 becomes a target temperature. The target temperature is determined based on the type of the sheet P, for example. The target temperature may be determined based on the type of the sheet P and environmental conditions (e.g., ambient temperature, ambient humidity). In this manner, the CPU 200a determines the target temperature based on the type of the sheet P as set by the user through the operation unit 13, or the type of the sheet P as sensed by the media sensor 14.

Media Sensor

Figure 5A:
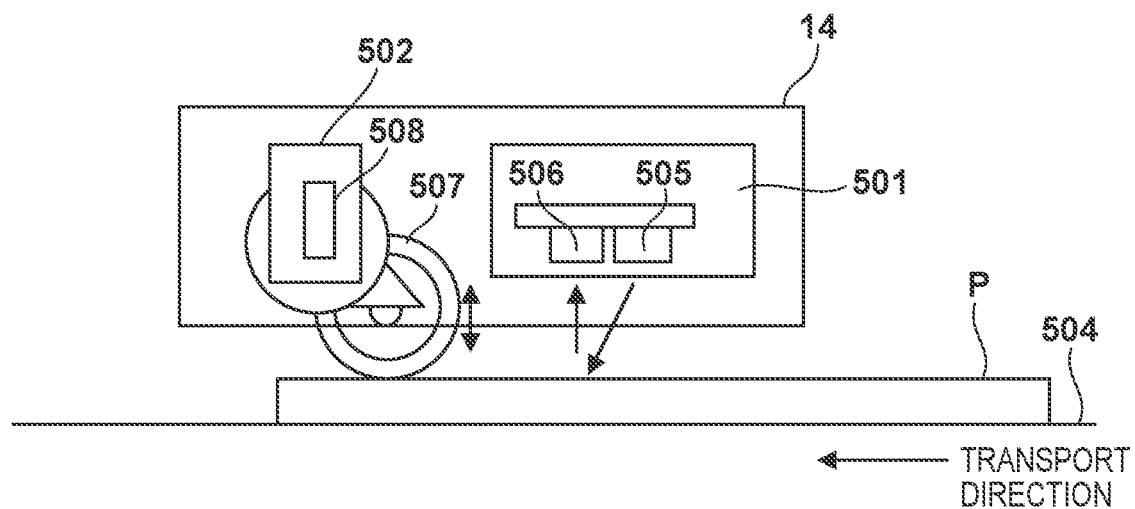
FIGS. 5A and 5B are diagrams illustrating a media sensor.

FIG. 5A illustrates an example of the media sensor 14. The media sensor 14 includes a surface property sensor 501 that detects surface properties of the sheet P and a thickness sensor 502 that detects the thickness of the sheet P.

Figure 5B:
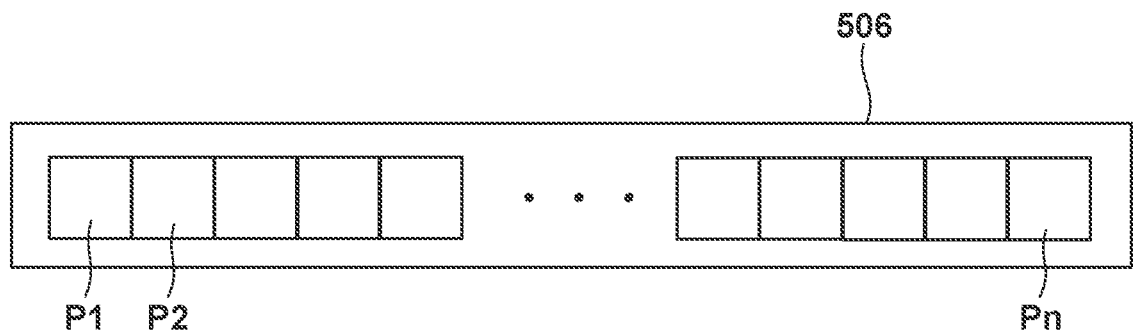

The surface property sensor 501 includes a light-emitting element 505 and a line sensor 506. The light-emitting element 505 is a light-emitting diode (LED) or the like that irradiates the surface of the sheet P being transported along a transport path 504 with light. The line sensor 506 has a plurality of light-receiving elements (pixels) that receive light reflected by the surface of the sheet P. As illustrated in FIG. 5B, n pixels P1 to Pn are arranged along a main scanning direction. The "main scanning direction" is the direction orthogonal to the transport direction of the sheet P.

When a sheet P is transported along the transport path 504, the CPU 200a turns on the light-emitting element 505 and causes the line sensor 506 to receive the reflected light from the sheet P. The CPU 200a calculates a difference between the luminances of adjacent pixels Pi and Pi-1 (an adjacent difference) and determines the surface properties (e.g., unevenness) of the sheet P based on the adjacent difference. The CPU 200a may also calculate the sum of luminance values of the pixels P1 to Pn and detect the glossiness of the surface of the sheet P based on the sum.

The thickness sensor 502 includes a roller 507 that is pushed in by the sheet P and an encoder sensor 508 that detects the amount by which the roller 507 is pushed in. The CPU 200a calculates the thickness of the sheet P based on a sensing result (a pushed-in amount) output by the thickness sensor 502. A sensing result may be called as a detecting result.

Relationship Between Detection Value and Media Characteristics

Figure 6A:
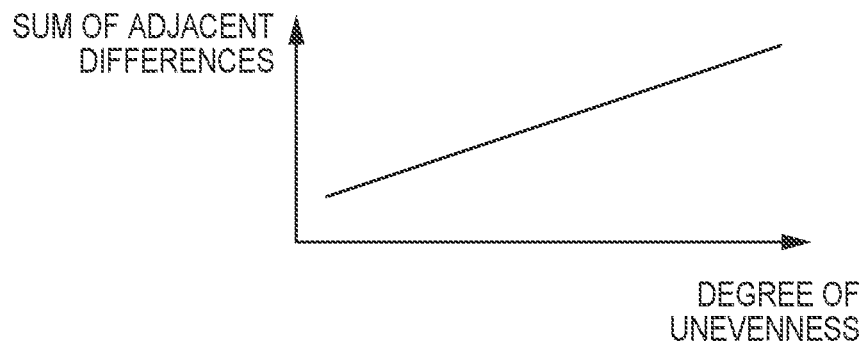
FIGS. 6A to 6C are diagrams illustrating a sheet type determination method.

FIG. 6A illustrates a relationship between a degree of unevenness and the adjacent difference sensed by the surface property sensor 501. The horizontal axis represents the degree of unevenness. The vertical axis represents the adjacent difference. From FIG. 6A, it can be seen that a linear relationship exists between the degree of unevenness and the adjacent difference.

A sum D of adjacent differences can be defined by Formula Eq1. Here, the detection values of pixels P1, P2, and so on up to Pn are denoted as p1, p2, and so on up to pn.

$$D=(p2-p1)+(p3-p2)+\ldots+(Pn-Pn-1) \quad \text{Eq1}$$

In this manner, when the pixel Pi and the pixel Pi-1 are adjacent to each other, a difference di between the detection value pi and the detection value pi-1 is calculated (here, i is an integer greater than or equal to 2 and less than or equal to n). Furthermore, the sum D of the differences di is calculated. The more uneven the surface of the sheet P is, the larger the output difference between adjacent pixels becomes. The output difference can therefore be converted into a degree of unevenness. If the surface is smooth, the sum D of adjacent differences will be smaller, whereas if the surface is rough, the sum D of adjacent differences will be larger.

Figure 6B:
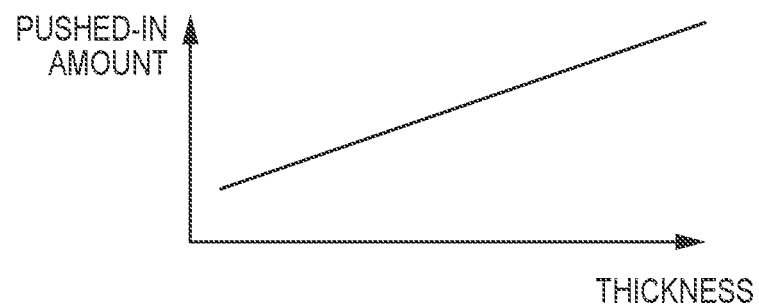

FIG. 6B illustrates a relationship between the pushed-in amount sensed by the thickness sensor 502 and the thickness of the sheet P. The horizontal axis represents the thickness. The vertical axis represents the pushed-in amount. From FIG. 6B, it can be seen that a linear relationship exists between the thickness and the pushed-in amount. Therefore, the CPU 200a can convert the detection value detected by the thickness sensor 502 (the pushed-in amount) into the thickness of the sheet P.

A conversion formula or a conversion table may be stored in the memory 201a. The CPU 200a can determine the degree of unevenness and the thickness by applying the detection values to the conversion formula or the conversion table.

Type Determination

Figure 6C:
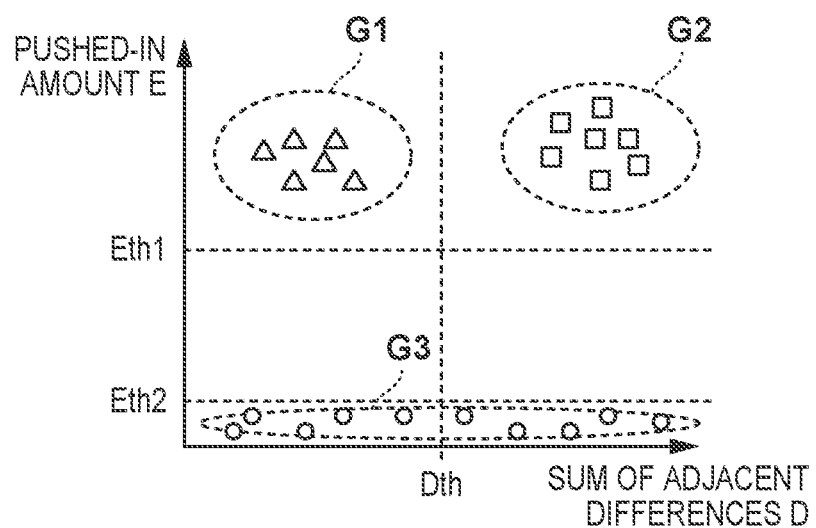

FIG. 6C illustrates a method for determining the type of the sheet P. The CPU 200a determines the type of the sheet P using the sum D of adjacent differences and a pushed-in amount E, which are the detection values detected by the media sensor 14. The horizontal axis in FIG. 6C represents the sum D of adjacent differences. The vertical axis represents the pushed-in amount E. Cardboard is paper that is thick and has a smooth surface. When the detection results for cardboard are plotted, the detection results are concentrated in a group G1. Embossed paper is paper that is thicker and has a more uneven surface. Accordingly, the detection results for embossed paper are concentrated in a group G2. As such, the CPU 200a can determine the type of the sheet P using the sum D of adjacent differences and the pushed-in amount E, which are the detection values detected by the media sensor 14.

For example, if the pushed-in amount E exceeds a threshold Eth1 and the sum D of adjacent differences is less than or equal to a threshold Dth, the CPU 200a determines that the type of the sheet P is "glossy cardboard". This corresponds to the group G1. If the pushed-in amount E exceeds the threshold Eth1 and the sum D of adjacent differences exceeds the threshold Dth, the CPU 200a determines that the type of the sheet P is "embossed paper". This corresponds to the group G2. If the pushed-in amount E is less than or equal to a threshold Eth2, the CPU 200a determines the type of the sheet P to be "thin paper". This corresponds to a group G3. Note that if the pushed-in amount E is less than or equal to the threshold Eth1 and the pushed-in amount E exceeds the threshold Eth2, the CPU 200a may determine the type of the sheet P to be "standard paper". These thresholds may be stored in the memory 201a. The CPU 200a determines the type of the sheet P by referring to these thresholds.

The structure of the media sensor 14 described here is merely one example. For example, the thickness sensor 502 may be realized by an ultrasonic sensor such as a piezoelectric element. Ultrasonic waves emitted from an ultrasonic oscillator are attenuated as they pass through the sheet P. Therefore, based on the level of ultrasonic waves received by an ultrasonic receiver, the CPU 200a can determine the thickness (grammage) of the sheet P. As a result, the type of the sheet P may be determined even more accurately. In this manner, any sensor that can determine the type of the sheet P can be employed as the media sensor 14.

According to FIG. 1, the media sensor 14 is disposed in the transport path. The media sensor 14 detects the type of the sheet P as the sheet P passes through a position opposite the media sensor 14. The type of the sheet P sensed by the media sensor 14 and the type of the sheet P designated through the operation unit 13 may differ. This may be referred to as a "type mismatch". In this case, the CPU 200a stops the transport of the sheet P. The CPU 200a may inform the user, through the operation unit 13, that the type of the sheet P sensed by the media sensor 14 and the type of the sheet P designated through the operation unit 13 differ. The user then removes the sheet P that is stopped in the transport path. Furthermore, after the sheet P is removed by the user, the CPU 200a executes image formation again. This results in poor usability. Accordingly, in the present embodiment, even if a type mismatch occurs, image formation on the sheet P continues if specific print permission conditions are satisfied. This improves the usability.

First Working Example

Figure 7:
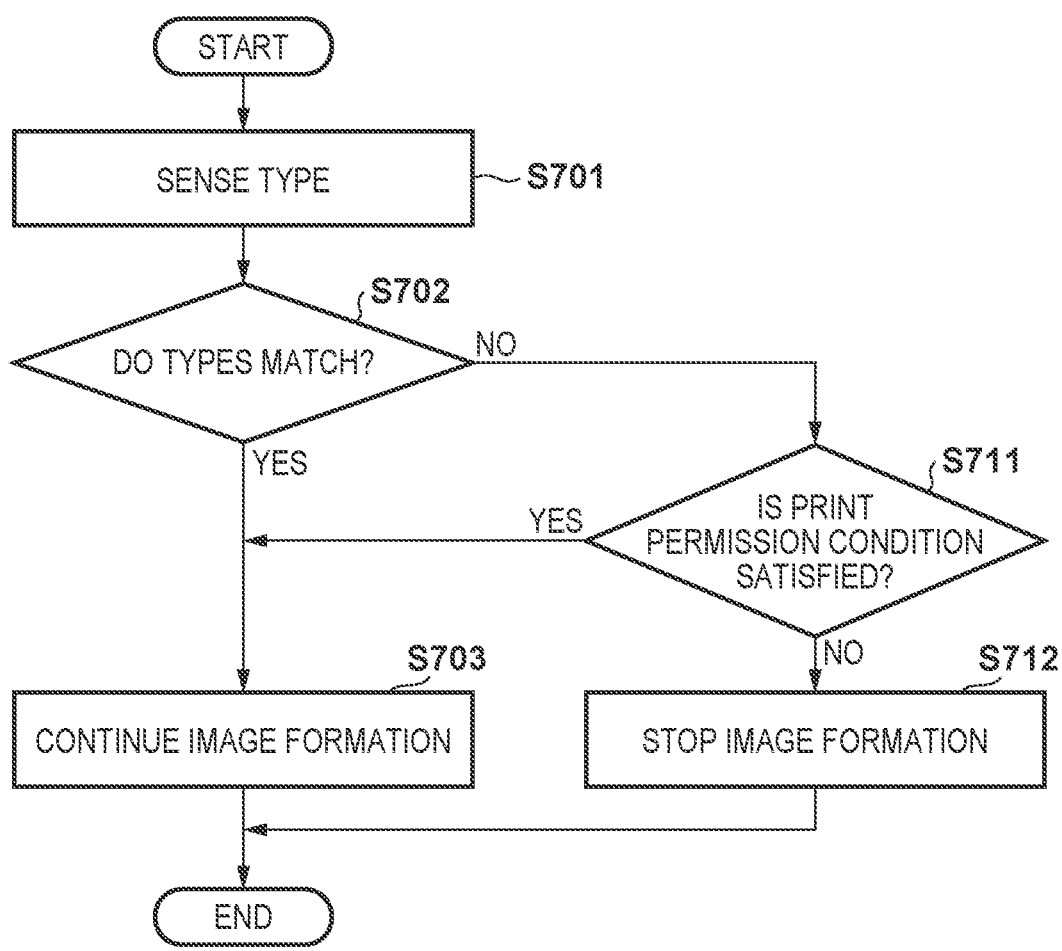
FIG. 7 is a flowchart illustrating a control method.
Figure 8:
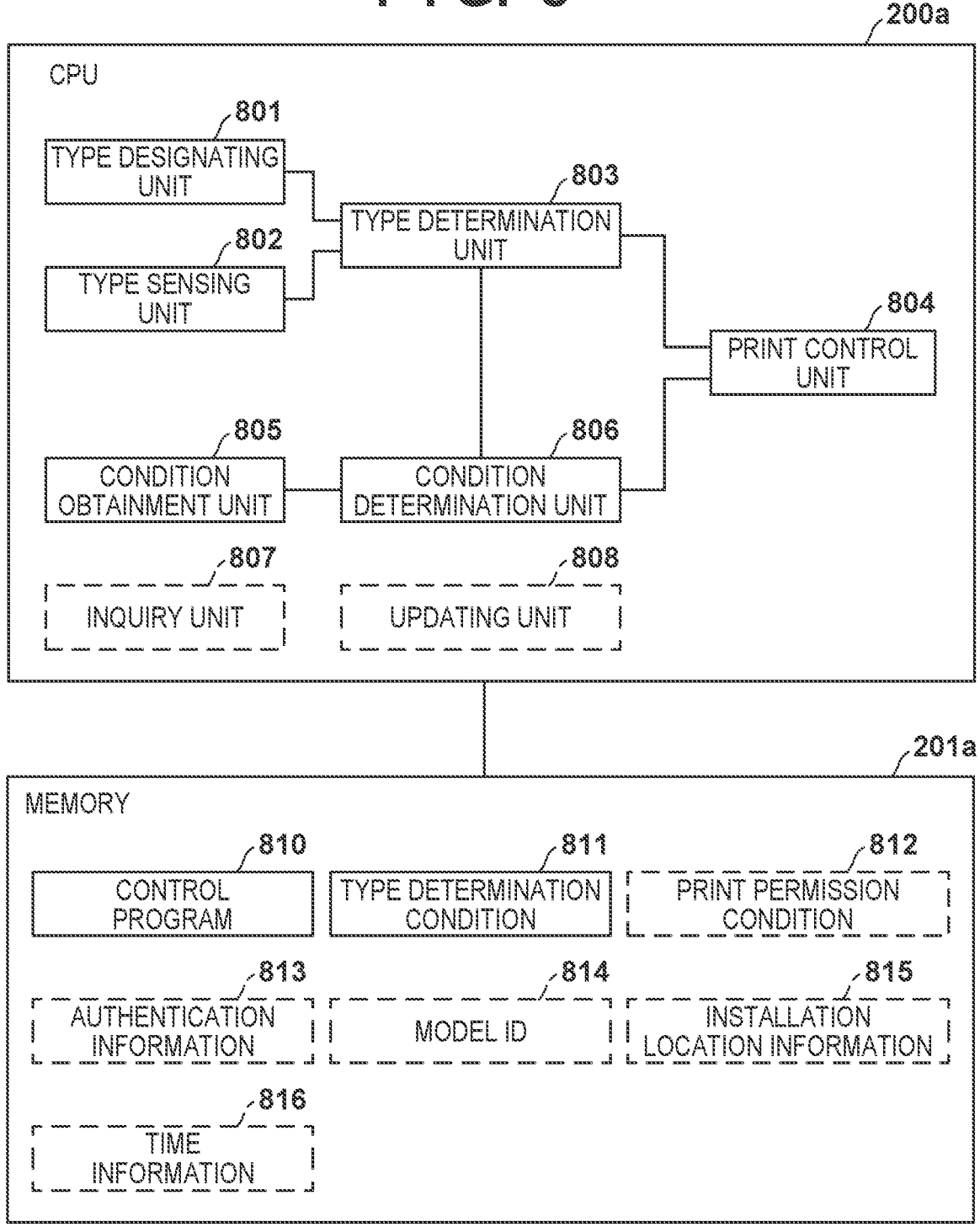
FIG. 8 is a diagram illustrating functions of a CPU.

FIG. 7 illustrates a control method executed by the CPU 200a. FIG. 8 illustrates functions implemented by the CPU 200a according to a control program 810. Each of the functions illustrated in FIG. 8 will be described together when the steps associated therewith are described.

When a printing instruction is input through the operation unit 13, the motor group M1 is started up to start feeding the sheet P. Next, the CPU 200a executes the following processing. It is assumed that, in advance, the CPU 200a (a type designating unit 801) receives the type of the sheet P input by an operator through the operation unit 13 and holds the type in the memory 201a. The operator is, for example, a user using the image forming apparatus 100 or an administrator managing the image forming apparatus 100.

In step S701, the CPU 200a (a type sensing unit 802) senses the type of the sheet P using the media sensor 14. The type sensing unit 802 senses the type of the sheet P being transported along the transport path 504 based on the sensing result output by the media sensor 14 and a type determination condition 811. The type determination condition 811 includes the aforementioned Formula Eq1, the thresholds Dth, Eth1, and Eth2, and the like.

In step S702, the CPU 200a (a type determination unit 803) determines whether user designation information indicating the type specified by the user (a user-designated type) and the sensing result from the media sensor 14 (a sensed type) match. If these types match, the CPU 200a moves the processing to step S703.

In step S703, the CPU 200a (a print control unit 804) continues image formation on the sheet P being transported along the transport path 504. If it is determined that the types do not match in step S702, the CPU 200a moves the processing to step S711.

In step S711, the CPU 200a (a condition determination unit 806) determines whether a print permission condition 812 is satisfied. The print permission condition 812 is a condition for continuing image formation even if the user-designated type and the sensed type do not match. The print permission condition 812 may be stored in the memory 201a or in the server 210. A condition obtainment unit 805 obtains the print permission condition 812 from the memory 201a or the server 210 and passes the condition to the condition determination unit 806. The condition determination unit 806 determines whether the print permission condition 812 is satisfied. Specific examples of the print permission condition 812 will be given later. If the print permission condition 812 is satisfied, the CPU 200a moves the processing to step S703 and continues the image formation. On the other hand, if the print permission condition 812 is not satisfied, the CPU 200a moves the processing to step S712.

In step S712, the CPU 200a (the print control unit 804) stops the image formation. The print control unit 804 stops the motor group M1, stops the fixer 17, and stops the image forming units 20. The print control unit 804 may display a message indicating that the user-designated type and the sensed type do not match in a display device of the operation unit 13. The print control unit 804 may display a message indicating that image formation has been stopped and prompting the user to remove the sheet P.

The print permission condition 812 may be, for example, any one, or a combination of two or more, of the following plurality of conditions:
(1) The sensed type is one of predefined types. Here, the types of sheets for which image formation is permitted are stored in the memories 201a and 201b (e.g., HDDs) in response to user inputs made through the operation unit 13.
(2) The user wishes to forcibly (or temporarily) continue image formation. User instruction information (a permission signal) that forces (permits) image formation to continue when there is a mismatch between the user-designated type and the sensed type is stored in the memories 201a and 201b (e.g., HDDs) in response to user inputs made through the operation unit 13.
(3) The user is one of predefined users. In other words, this is when user identification information is included in pre-set permitted user identification information.
(4) The image forming apparatus is one of predefined image forming apparatuses.
(5) The installation location of the image forming apparatus is a predefined installation location.
(6) Time information such as the current year, month, day, time, and the like is within a predefined range.

For example, if the sensed type is an expensive type, the image formation may not be permitted to continue, but if the sensed type is an inexpensive type, the printing may be permitted to continue. In this case, the server 210 may manage inexpensive types as permitted print types. Alternatively, an inquiry unit 807 may inquire with the user through the operation unit 13, and the user may wish to continue image formation. Alternatively, image formation may be permitted for users of a higher rank, and not permitted for users of a lower rank. Alternatively, a type mismatch may lead to a major drop in print quality (image quality) in a given model, but a type mismatch may only lead to a minor drop in print quality in another model. In this case, image formation may be permitted to be continued in another model. Alternatively, a difference in print quality due to a type mismatch may be greater between an image forming apparatus 100 installed at a given installation location and an image forming apparatus 100 installed at another installation location. On the other hand, a difference in print quality due to a type mismatch among a plurality of multiple image forming apparatuses 100 installed at the same installation location may be small. This is because the printing applications and the types of the sheet P for a plurality of image forming apparatuses 100 installed in the same installation location are often identical or similar. Alternatively, if the time (time information 816) obtained from the RTC 203 of the CPU 200a is within a specific range, image formation may be permitted to continue.

In this manner, in the first working example, if the user-designated type and the sensed type match, the image formation is continued. Even if the user-designated type and the sensed type do not match, the image formation is continued if the print permission condition 812 is satisfied. This is expected to improve usability.

Second Working Example

In a second working example, at least one of the following conditions is employed as the print permission condition 812: the sensed type is permitted by the server 210; and the user wishes to continue the image formation. Accordingly, if the sensed type is permitted by the server 210, the image formation is continued. Even if the sensed type is not permitted by the server 210, the image formation is continued if the user wishes to continue the image formation.

Figure 9:
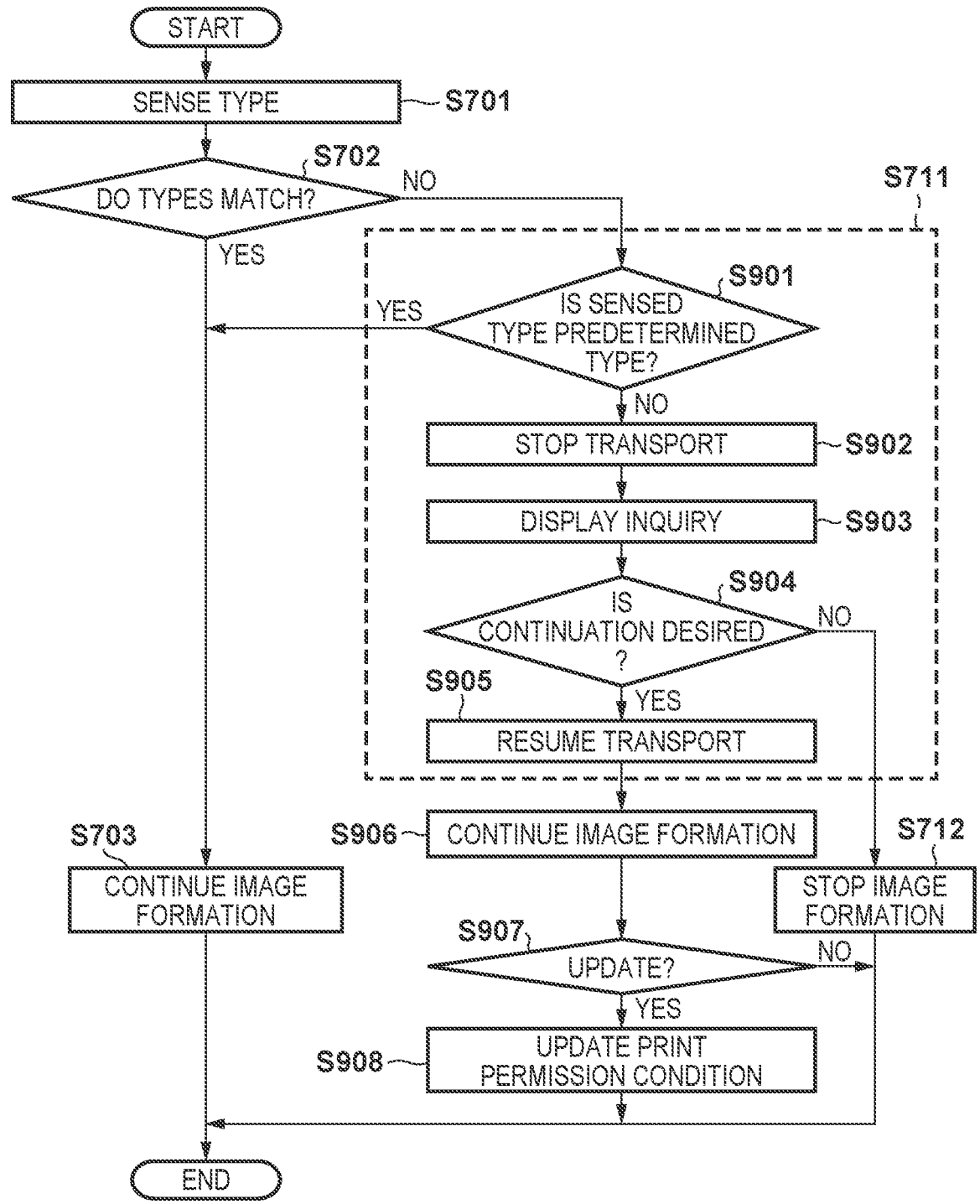
FIG. 9 is a flowchart illustrating a control method.

FIG. 9 illustrates a control method executed by the CPU 200a. Note that in FIG. 9, steps that are the same as in FIG. 7 are given the same reference signs, and will not be described. As illustrated in FIG. 9, step S711 is constituted by steps S901 to S905.

In step S901, the CPU 200a (the condition determination unit 806) determines whether the sensed type is a predetermined type. For example, the condition determination unit 806 accesses the server 210 via the condition obtainment unit 805 and obtains the permitted type information held in the memory 201b of the server 210. The permitted type information is part of the print permission condition 812, and is information indicating the type of the sheet P (a predetermined type) for which image formation can continue even if the type differs from the user-designated type. Here, the predetermined type may be a plurality of types (a range). If the sensed type is the predetermined type, the CPU 200a moves the processing to step S703 and continues the image formation. If the sensed type is not the predetermined type, the CPU 200a moves the processing to step S902.

In step S902, the CPU 200a (the print control unit 804) stops the transport of the sheet P. The print control unit 804 stops the motors in motor group M1 that are involved in transporting the sheet P.

In step S903, the CPU 200a (the inquiry unit 807) displays an inquiry in the display of the operation unit 13. Here, the "inquiry" is a message inquiring with the user as to whether they wish to continue the image formation. The inquiry may be output by audio through the speaker of the operation unit 13. In this case, the user inputs the answer by voice through the microphone of the control unit 13.

Figure 10A:
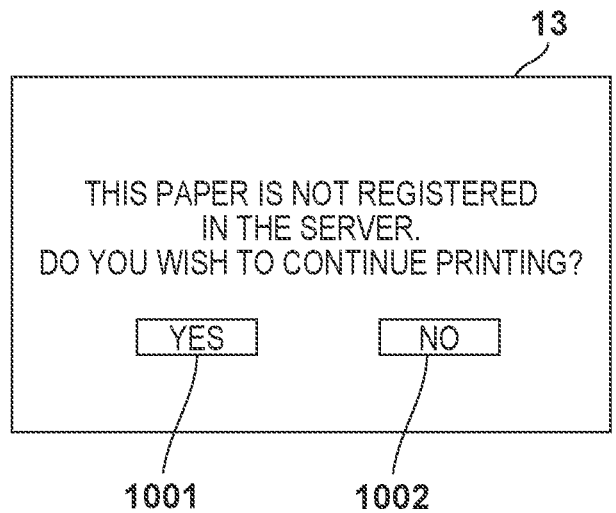
FIGS. 10A and 10B are diagrams illustrating a user interface.

FIG. 10A illustrates an example of an inquiry message displayed in the operation unit 13. In this example, a message reading "this paper is not registered in the server. Do you wish to continue printing?" is displayed. The user enters their preference by pressing a "YES" button 1001 or a "NO" button 1002.

In step S904, the CPU 200a (the condition determination unit 806) determines whether the user wishes to continue the image formation based on information input from the operation unit 13. For example, when the "YES" button 1001 displayed in the operation unit 13 is pressed, the CPU 200a determines that the user wishes to continue the image formation. When the "NO" button 1002 displayed in the operation unit 13 is pressed, the CPU 200a determines that the user does not wish to continue the image formation. If the user does not wish to continue the image formation, the CPU 200a moves the processing to step S712 and stops the image formation. On the other hand, if the user wishes to continue the image formation, the CPU 200a moves the processing to step S905.

In step S905, the CPU 200a (the print control unit 804) resumes the transport of the sheet P. The print control unit 804 restarts the motors in motor group M1 that are involved in transporting the sheet P.

In step S906, the CPU 200a (the print control unit 804) continues the image formation on the sheet P.

In step S907, the CPU 200a (an updating unit 808) determines whether to update the print permission condition 812. For example, the CPU 200a (the inquiry unit 807) may display a predetermined inquiry message in the operation unit 13. This message inquires with the user as to whether to add the current sensed type to the permitted type information held in the memory 201b of the server 210.

Figure 10B:
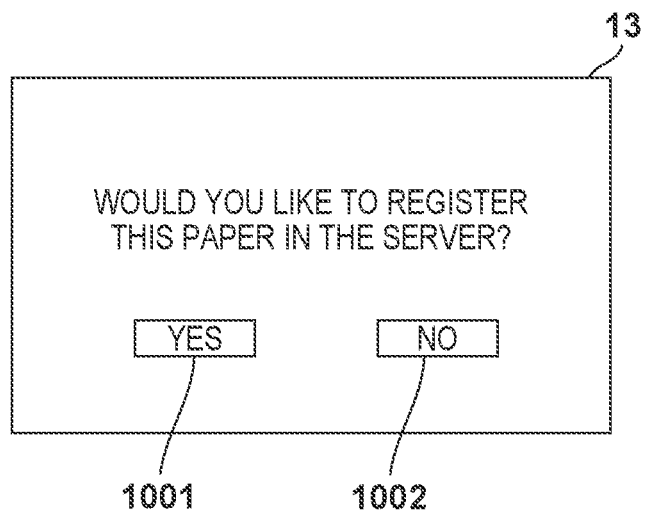

FIG. 10B illustrates an example of an inquiry message displayed in the operation unit 13. In this example, a message reading "do you wish to register this paper in the server?" is displayed. The user enters their preference by pressing the "YES" button 1001 or the "NO" button 1002.

The CPU 200a (the updating unit 808) determines whether to add the current sensed type to the permitted type information based on the answer entered by the user in response to the inquiry. If the print permission condition 812 is updated, the CPU 200a moves the processing to step S908. If the print permission condition 812 is not updated, the CPU 200a skips step S908.

In step S908, the CPU 200a (the updating unit 808) updates the print permission condition 812. For example, the current sensed type is added to the print permission condition 812 stored in the memory 201b of the server 210. As a result, the current sensed type also belongs to the predetermined type, and thus a determination of "Yes" is made in step S901. In other words, steps S902 to S908 are skipped, which further improves the usability.

In the second working example, the print permission condition 812 is stored in the memory 201b of the server 210, but this is merely one example. The print permission condition 812 may be stored in the memory 201a of the image forming apparatus 100. The CPU 200a obtains the print permission condition 812 from the memory 201a of the image forming apparatus 100 instead of the memory 201b of the server 210.

Third Working Example

Figure 11:
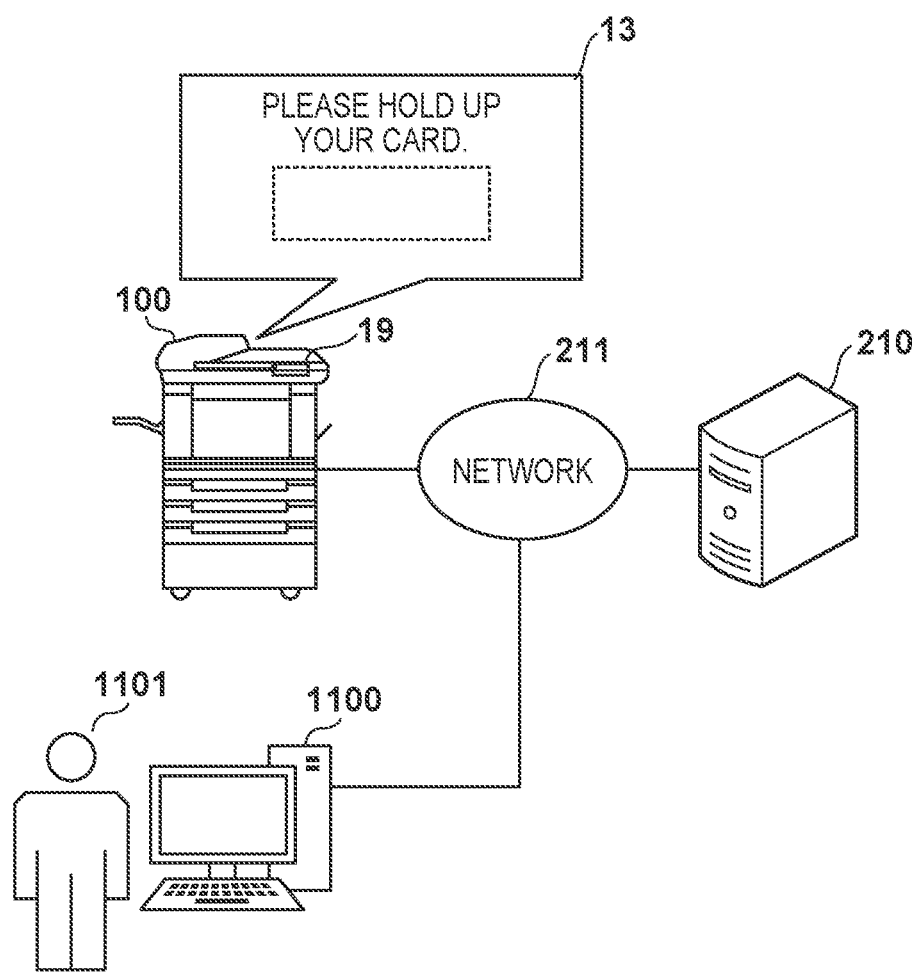
FIG. 11 is a diagram illustrating user authentication.

In a third working example, it is assumed that the image forming apparatus 100 has a user recognition function, such as the authentication device 19. As illustrated in FIG. 11, an information processing apparatus 1100 is further connected to the network 211.

The authentication device 19 is capable of executing user authentication (e.g., card-based authentication or user account authentication). "Card-based authentication" refers to authentication information recorded in a card held by the user over the authentication device 19 being read by the authentication device 19, and determining whether a user 1101 is an authorized user based on the authentication information. The card may be an IC card, a magnetic card, or a mobile terminal (e.g., a smartphone). The authentication information may be an authentication image (e.g., a barcode or a QR code (registered trademark)) printed or displayed on the card. In these cases, the authentication device 19 may be referred to as a "card reader". The authentication device 19 may be a biometric authentication device that reads biometric information (e.g., fingerprints or veins) of the user 1101 and determines whether the user is a predetermined user. In user account authentication, the authentication of the user 1101 is executed based on a user ID (and password) entered through the operation unit 13. A database holding user authentication information may be constructed in the memory 201b of the server 210, for example. The information processing apparatus 1100 is a personal computer (PC) or a mobile terminal, and is a computer that sends print jobs to the image forming apparatus 100.

FIG. 12A illustrates a database 1200 stored in the memory 201b of the server 210. Information necessary for authentication, such as user names, IDs, and passwords, is registered in the database 1200. The CPU 200a transmits an authentication request, including authentication information 813 entered from the operation unit 13 or the authentication device 19, to the server 210. Upon receiving the authentication request, the CPU 200b of the server 210 determines whether the received authentication information 813 matches authentication information registered in the database 1200. The CPU 200b transmits an authentication result to the image forming apparatus 100. The CPU 200a of the image forming apparatus 100 (the condition determination unit 806) determines whether to permit the user 1101 to form images based on the authentication result received from the server 210. As a result, image formation is permitted only for users registered in the database 1200. Furthermore, the print permission condition 812, which indicates the type of the sheet P that is permitted to be printed, is registered in the database 1200 on a user-by-user basis. As described in the first and second working examples, the print permission condition 812 indicates the type of the sheet P that is permitted to be printed even when the user-designated type and the sensed type do not match. As illustrated in FIG. 12A, the print permission condition 812 may be different for each user.

Figure 13:
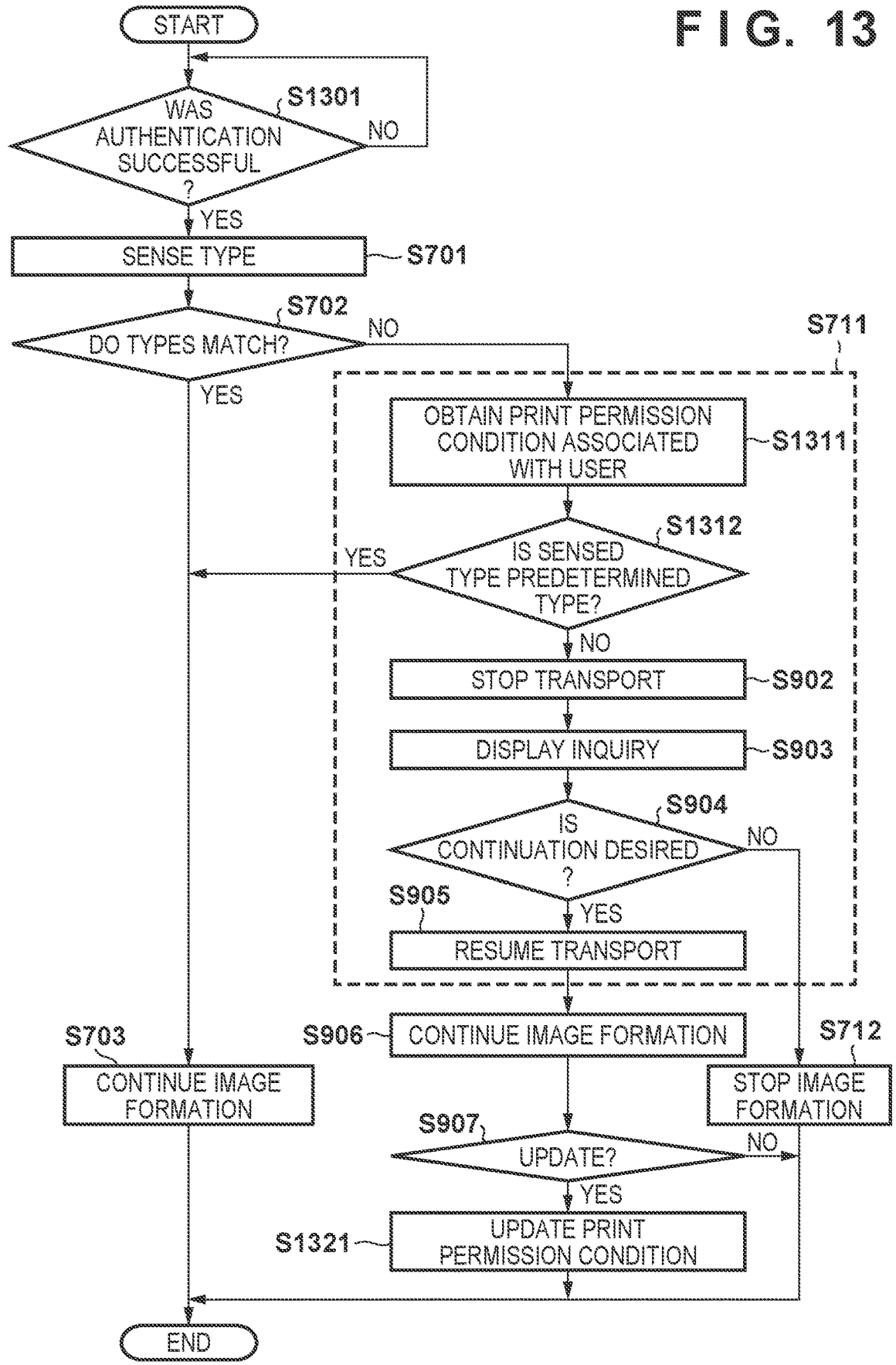
FIG. 13 is a flowchart illustrating a control method.

FIG. 13 illustrates a control method executed by the CPU 200a. Note that in FIG. 13, steps that are the same as in FIG. 7 or FIG. 9 are given the same reference signs, and will not be described.

In step S1301, the CPU 200a (the condition determination unit 806) determines whether the user authentication was successful. As described above, the CPU 200a executes the user authentication using the authentication information 813 entered through the authentication device 19 or the operation unit 13. For example, the CPU 200a may transmit an authentication request including the authentication information 813 to the server 210 and receive an authentication result. Alternatively, the CPU 200a may transmit an authentication request, for requesting comparison information needed for authentication processing, to the server 210, receive the comparison information, and compare the comparison information with the authentication information 813. If the authentication is successful, the CPU 200a moves the processing to step S701.

If a mismatch between the user-designated type and the sensed type is determined in step S702, the CPU 200a moves the processing to step S1311. In step S1311, the CPU 200a (the condition obtainment unit 805) obtains the print permission condition 812 associated with the user from the server 210. The CPU 200a (the condition obtainment unit 805) may store the print permission condition 812 obtained from the server 210 in the memory 201a.

In step S1312, the CPU 200a (the type determination unit 803) determines whether the sensed type is a predetermined type based on the print permission condition 812. The type determination unit 803 determines whether the sensed type satisfies the print permission condition 812. For example, assume that the authenticated user is a user A illustrated in FIG. 12A, the user-designated type is standard paper, and the sensed type is cardboard. In this case, the user A is permitted to print on cardboard (the predetermined type) even if there is a type mismatch. The sensed type is therefore determined to be the predetermined type. If the sensed type is the predetermined type, the CPU 200a moves the processing to step S703. On the other hand, if the sensed type is not the predetermined type, the CPU 200a moves the processing to step S902. For example, a user B is not permitted to print on cardboard in a case of a type mismatch, and thus the CPU 200a moves the processing to step S902.

Thereafter, if a determination of "Yes" is made in step S907, the CPU 200a moves the processing to step S1321. In step S1321, the CPU 200a (the updating unit 808) updates the print permission condition 812 to add the sensed type as a predetermined type. For example, the updating unit 808 adds the sensed type to the print permission condition 812 associated with the user in the server 210. For example, if the authenticated user is the user A and the sensed type is a translucent resin film, "translucent resin film" is added to the print permission condition 812 for the user A.

According to the third working example, the print permission condition 812 is managed on a user-by-user basis. Accordingly, even if the print permission condition 812 for the user A is updated or changed, this will not affect the user B. In addition, because the print permission condition 812 is updated, printing can immediately continue if a type mismatch occurs next for the current sensed type (e.g., resin film). Accordingly, printing is no longer interrupted, which further improves the usability.

Fourth Working Example

In the second and third working examples, printing on a sheet P of a predetermined type is permitted even if a type mismatch occurs. Here, the performance specifications of the image forming apparatus 100 may be further considered as the print permission condition 812. A typical example of performance specifications is printing speed. For example, the same type of sheet P may have low image quality on a given image forming apparatus and high image quality on another image forming apparatus. Therefore, the print permission condition 812 may include that the performance specifications of the image forming apparatus 100 are predetermined performance specifications. In general, the performance specifications of image forming apparatuses differ by model name (or model identification code). Thus, the print permission condition 812 may be managed for each model name. Alternatively, the print permission condition 812 may be commonly managed for each of model groups (performance specification groups), which include a plurality of models having the same or similar performance specifications.

FIG. 12B illustrates management information (a database 1210) stored in the memory 201b of the server 210. In this example, the type of the sheet P permitted to be printed is registered for each of model IDs. The model ID may be any information that can identify each model, such as a model name or a model identification code.

Figure 14:
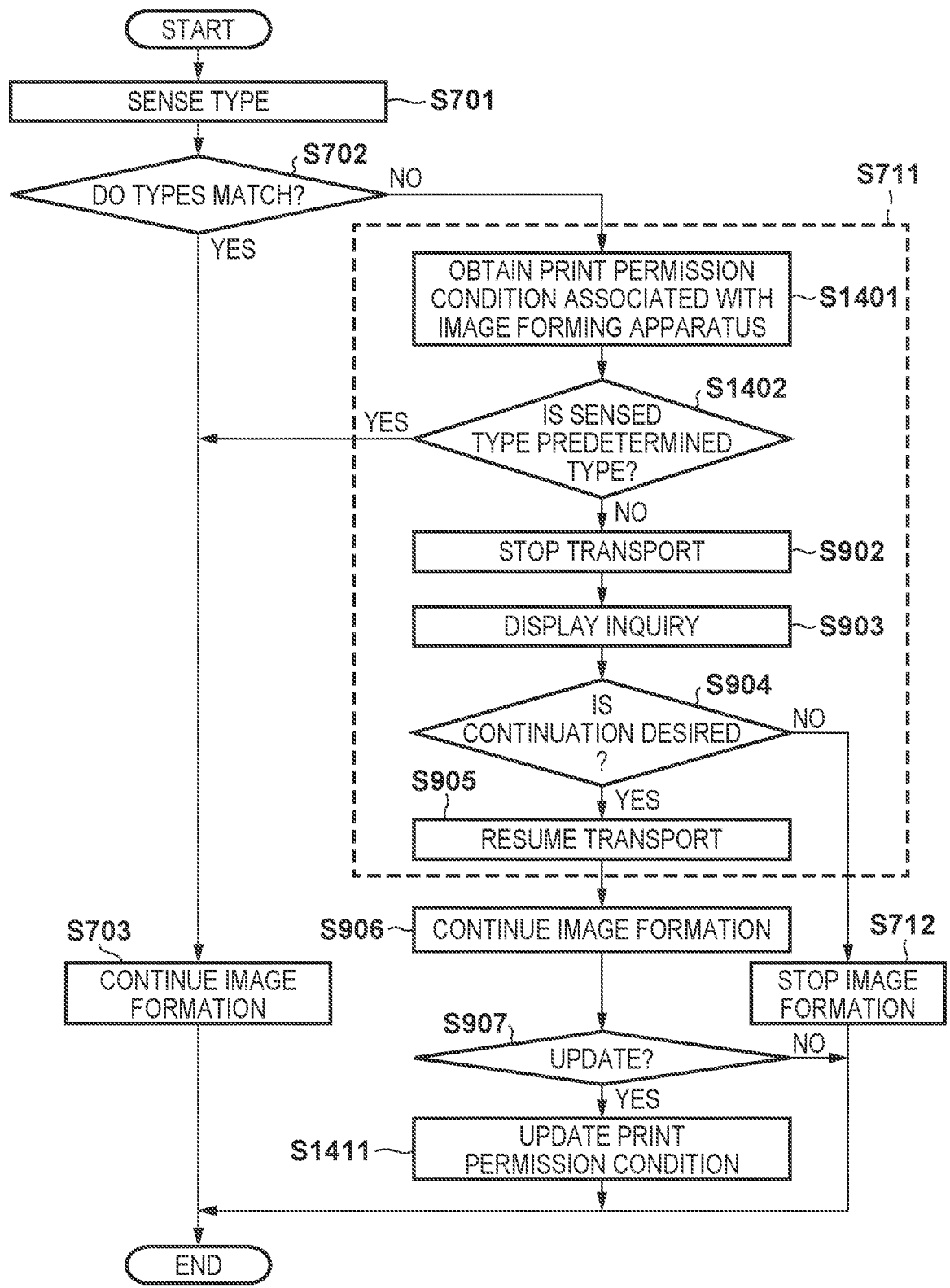
FIG. 14 is a flowchart illustrating a control method.

FIG. 14 illustrates a control method executed by the CPU 200a. Note that in FIG. 14, steps that are the same as in FIG. 7, FIG. 9, or FIG. 13 are given the same reference signs, and will not be described. Here, step S901 is replaced by steps S1401 and S1402, and step S908 is replaced by step S1411.

In step S1401, the CPU 200a (the condition obtainment unit 805) obtains the print permission condition 812 associated with the image forming apparatus 100. For example, the condition obtainment unit 805 reads out a model ID 814 of the image forming apparatus 100 from the memory 201a and transmits the model ID to the server 210. The CPU 200b of the server 210 reads out the print permission condition 812 corresponding to the model ID 814 from the memory 201b and transmits the condition to the image forming apparatus 100. If the print permission condition 812 is managed for each of performance specifications (e.g., printing speed), identification information indicating the performance specifications is transmitted to the server 210, and the print permission condition 812 corresponding to the identification information is obtained.

In step S1402, the CPU 200a (the condition determination unit 806) determines whether the sensed type is a predetermined type based on the received print permission condition 812. If the sensed type is the predetermined type, the CPU 200a moves the processing to step S703. If the sensed type is not the predetermined type, the CPU 200a moves the processing to step S902.

In step S1411, the CPU 200a updates the print permission condition 812 associated with the model ID 814 (or the performance specifications) of the image forming apparatus 100. As described above, the updating unit 808 accesses the server 210 and adds the type information of the sheet P permitted to be printed by the user to the print permission condition 812. Through this, printing onto the sheet P is permitted in the same model or other models having the same or similar performance specifications, which further improves the usability.

Fifth Working Example

In a fifth working example, the installation location of the image forming apparatus 100 is taken into consideration as a print permission condition. An "installation location" is, for example, a latitude and longitude, an address, a building, a floor (number), a room, or the like. For example, if an installation location A and an installation location B are close to each other, the content printed by the respective image forming apparatuses 100 will likely be similar. If the installation location A and the installation location B are close to each other, the usages of the printed materials printed by the respective image forming apparatuses 100 will likely be the same or similar. On the other hand, if the installation location A and the installation location B are far apart, it is more likely that the content or the usages of the printed materials will be different. Therefore, if the installation location A and the installation location B are close to each other, the print permission conditions 812 are expected to be similar. In particular, for a plurality of image forming apparatuses 100 installed at the installation location A, the respective print permission conditions 812 will be very similar. The same is true for the installation location B. Accordingly, in the fifth working example, the print permission condition 812 is managed and updated for each installation location.

FIG. 12C illustrates management information (a database 1220) stored in the memory 201b of the server 210. In this example, the type of the sheet P permitted to be printed is registered for each installation location.

Figure 15:
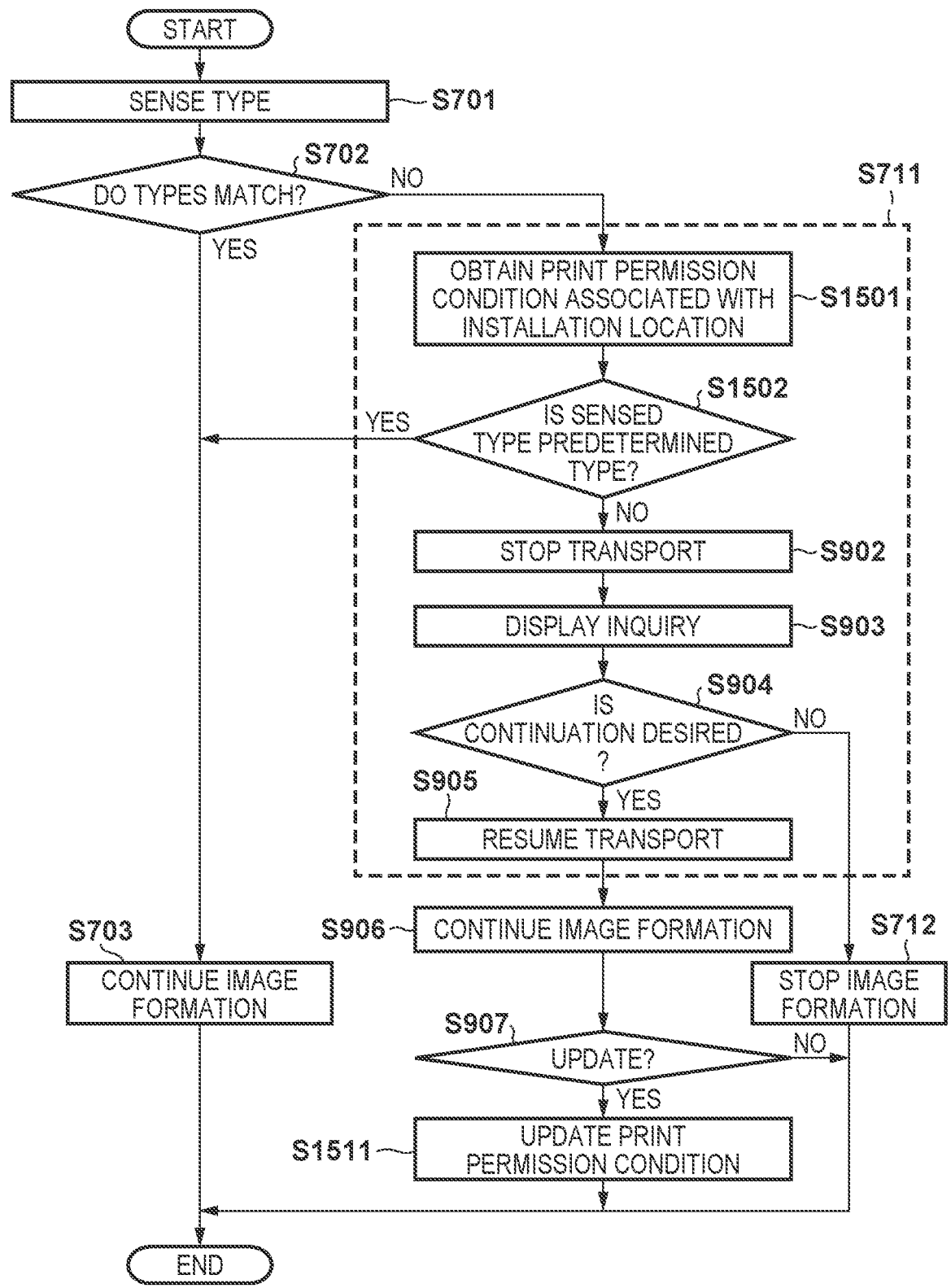
FIG. 15 is a flowchart illustrating a control method.

FIG. 15 illustrates a control method executed by the CPU 200a. Note that in FIG. 15, steps that are the same as in FIG. 7, FIG. 9, FIG. 13, or FIG. 14 are given the same reference signs, and will not be described. Here, step S901 is replaced by steps S1501 and S1502, and step S908 is replaced by step S1511.

In step S1501, the CPU 200a (the condition obtainment unit 805) obtains the print permission condition 812 associated with the installation location of the image forming apparatus 100. For example, the condition obtainment unit 805 reads out installation location information 815 stored in the memory 201a of the image forming apparatuses 100, and transmits the information to the server 210. The CPU 200b of the server 210 reads out the print permission condition 812 corresponding to the installation location information 815 from the memory 201b and transmits the condition to the image forming apparatus 100.

In step S1502, the CPU 200a (the condition determination unit 806) determines whether the sensed type is a predetermined type based on the print permission condition 812. If the sensed type is the predetermined type, the CPU 200a moves the processing to step S703. If the sensed type is not the predetermined type, the CPU 200a moves the processing to step S902.

In step S1511, the CPU 200a updates the print permission condition 812 associated with the installation location information of the image forming apparatus 100. As described above, the updating unit 808 accesses the server 210 and adds the type information of the sheet P permitted to be printed by the user to the print permission condition 812. Through this, printing onto the sheet P is permitted even for another image forming apparatus 100 associated with the same installation location information, which further improves the usability.

Sixth Working Example

Incidentally, the durability of the image forming apparatus 100 or the environmental conditions where the image forming apparatus 100 is installed vary from day to day. For example, if consumables are not replaced, the durability in January will likely be different from the durability in May. Accordingly, the image quality in January may differ from the image quality in May. As such, if the sensed type is not a predetermined type, the image quality may be even further from the user's expectations. On the other hand, there is likely not much of a difference between the image quality on a Monday and the image quality on a Friday within the same week. In model having high durability, there may be no significant difference between the image quality in the first week and the image quality in the third week of the same month. Accordingly, in a sixth working example, time information is further taken into account as the print permission condition 812.

FIG. 12D illustrates management information (a database 1230) stored in the memory 201b of the server 210. In this example, the type of the sheet P permitted to be printed is registered for each instance of time information.

Figure 16:
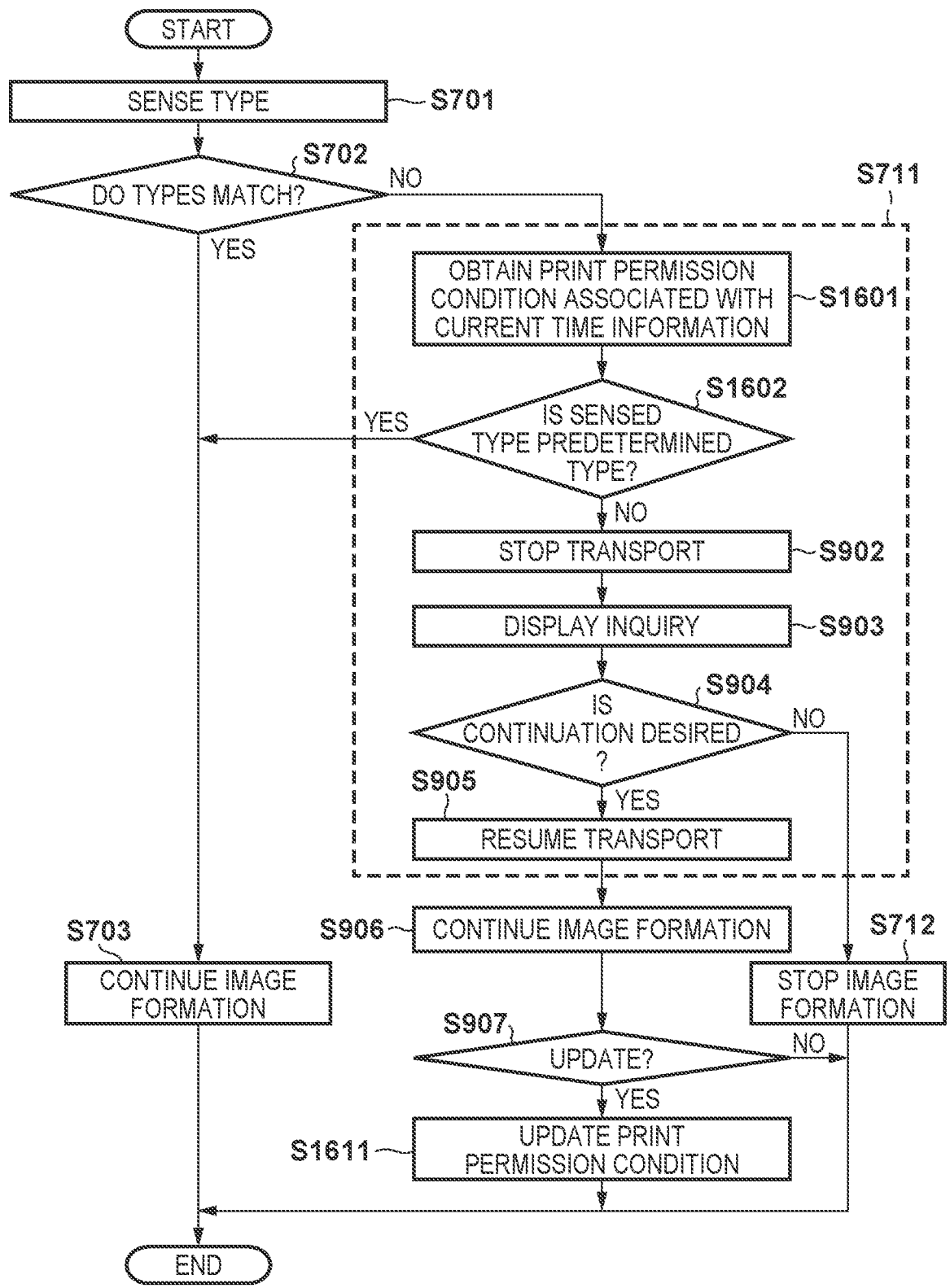
FIG. 16 is a flowchart illustrating a control method.

FIG. 16 illustrates a control method executed by the CPU 200a. Note that in FIG. 16, steps that are the same as in FIG. 7, FIG. 9, FIG. 13, FIG. 14, or FIG. 15 are given the same reference signs, and will not be described. Here, step S901 is replaced by steps S1601 and S1602, and step S908 is replaced by step S1611.

In step S1601, the CPU 200a (the condition obtainment unit 805) obtains the print permission condition 812 associated with the current time information 816. For example, the condition obtainment unit 805 reads out the time information 816 obtained from the RTC 203 and stored in the memory 201a, and transmits the information to the server 210. The CPU 200b of the server 210 reads out the print permission condition 812 corresponding to the received time information 816 from the memory 201b and transmits the condition to the image forming apparatus 100.

In step S1602, the CPU 200a (the condition determination unit 806) determines whether the sensed type is a predetermined type based on the print permission condition 812. If the sensed type is the predetermined type, the CPU 200a moves the processing to step S703. If the sensed type is not the predetermined type, the CPU 200a moves the processing to step S902.

In step S1611, the CPU 200a (the updating unit 808) updates the print permission condition 812 associated with the time information 816 of the image forming apparatus 100. As described above, the updating unit 808 accesses the server 210 and adds the type information of the sheet P permitted to be printed by the user to the print permission condition 812. Through this, printing onto the sheet P is permitted as long as the time or day falls within the same time information range, which further improves the usability.

Variations

According to FIG. 1, the media sensor 14 is disposed in the transport path, but this is merely one example. The sensing of the type of the sheet P by the media sensor 14 may be performed at any time before the toner image is transferred onto the sheet P. Accordingly, the media sensor 14 may be disposed in the holding unit 10. Alternatively, the media sensor 14 may be disposed before the secondary transfer nip 28.

Technical Spirit Derived from Working Examples

The holding unit 10 is an example of a holding unit (holding tray) that holds sheets. The transport device 2 is an example of a transport unit (a transport roller) that transports sheets held in the holding unit. The media sensor 14 is an example of a sensing unit that senses the type of the sheet. The image forming unit 20 is an example of an image forming unit (a printer) that forms an image on the sheet. The CPU 200a is an example of a control unit (a processor, a processing circuit, a control board) that controls the transport unit and the image forming unit. The CPU 200a obtains a user-designated type regarding the type of the sheets held in the holding unit. The type of the sheet sensed by the sensing unit may match the user-designated type. In this case, the CPU 200*a* controls the image forming unit so that an image is formed on the sheet being transported by the transport unit. However, the type of the sheet sensed by the sensing unit may not match the user-designated type. In this case, the CPU 200*a* determines whether user instruction information permitting image formation by the image forming unit on the sheet transported by the transport unit has been input. There are cases where the type of the sheet sensed by the sensing unit does not match the user-designated type, but the user instruction information has been input. In this case, the CPU 200*a* controls the image forming unit so that an image is formed on the sheet being transported by the transport unit. There are also cases where the type of the sheet sensed by the sensing unit does not match the user-designated type, and the user instruction information has not been input. In this case, the CPU 200*a* controls the image forming unit so that an image is not formed on the sheet being transported by the transport unit. This improves the usability.

The type of the sheet sensed by the sensing unit may not match the user-designated type. In this case, the CPU 200*a* may display, in a display, a screen for inputting the user instruction information. The user can input the user instruction information while visually confirming the information, which improves the usability.

When the user instruction information is input, the CPU 200*a* may update the user-designated type by adding the type of the sheet sensed by the sensing unit to the user-designated type. Through this, the types permitted by the user this time will be permitted to be printed next time without needing to wait for user instructions. This further improves the usability.

Other Aspects

The type of the sheet sensed by the sensing unit may match the type of a sheet designated in advance by the user or an operator serving as an administrator. In this case, the CPU 200*a* permits image formation on the sheet being transported by the transport unit. There are cases where the type of the sheet sensed by the sensing unit does not match the type of the sheet designated in advance, but a predetermined print permission condition is satisfied. In this case, the CPU 200*a* permits image formation on the sheet being transported by the transport unit. There are cases where the type of the sheet sensed by the sensing unit does not match the type of the sheet designated in advance, and a predetermined print permission condition is not satisfied. In this case, the CPU 200*a* stops image formation on the sheet being transported by the transport unit. In this manner, even if the sensed type differs from the user-designated type, image formation is permitted as long as the print permission condition is satisfied. This improves the usability.

The type of the sheet sensed by the sensing unit may not match the type designated in advance. In this case, the display device of the operation unit 13 may function as an output unit that outputs an inquiry to the user as to whether to continue the image formation. The input device of the operation unit 13 may function as an input unit that accepts an input of a response to the inquiry. As described with relation to step S904, the predetermined print permission condition may be that the response is a response for continuing the image formation. Even if the sensed type differs from the user-designated type, printing can be executed if the user wishes to print. This improves the usability.

The predetermined print permission condition may be that the type of the sheet sensed by the sensing unit is a type that belongs to a predefined range. In this manner, a sensed type for which printing is permitted even if the sensed type differs from the user-designated type may be determined in advance. For example, as described with reference to FIGS. 12A to 12D and the like, the predefined range may be defined by a server connected to the image forming apparatus.

The predetermined print permission condition may be that the user who is attempting to form an image on the sheet is a user who belongs to a predefined range. For example, a user who is successfully authenticated is an example of a user who belongs to a predefined range. This makes it possible for specific users to form an image on a sheet of a sensed type that is different from the user-designated type. As described with reference to FIG. 12A, the types for which printing is permitted may be determined in advance for each user.

The predetermined print permission condition may be that two conditions are satisfied at the same time. The first condition is that the user who is attempting to form an image on the sheet is a user who belongs to a predefined range. The second condition is that the type of the sheet sensed by the sensing unit is a type that belongs to a predefined range with respect to the user.

The predetermined print permission condition may be that the model of the image forming apparatus is a model belonging to a predefined range. Through this, when the image forming apparatus is a specific model, printing is permitted even if the sensed type differs from the user-designated type.

The predetermined print permission condition may be that two conditions are satisfied at the same time. The first condition is that the model of the image forming apparatus is a model belonging to a predefined range. The second condition is that the type of the sheet sensed by the sensing unit is a type that belongs to a predefined range with respect to the image forming apparatus. Accordingly, the types for which printing is permitted can be managed for each image forming apparatus.

The predetermined print permission condition may be that the installation location of the image forming apparatus is an installation location belonging to a predefined range. Through this, for an image forming apparatus installed in a specific installation location, printing is permitted even if the sensed type differs from the user-designated type.

The predetermined print permission condition may be that two conditions are satisfied at the same time. The first condition is that the installation location of the image forming apparatus is an installation location belonging to a predefined range. The second condition is that the type of the sheet sensed by the sensing unit is a type that belongs to a predefined range with respect to the installation location. Through this, the types for which printing is permitted can be managed for each installation location.

The predetermined print permission condition may be that time information associated with the image forming apparatus is time information belonging to a predefined range. Through this, when the time information of the image forming apparatus is specific time information, printing is permitted even if the sensed type differs from the user-designated type.

The predetermined print permission condition may be that two conditions are satisfied at the same time. The first condition is that time information associated with the image forming apparatus is time information belonging to a predefined range. The second condition is that the type of the sheet sensed by the sensing unit is a type that belongs to a predefined range with respect to the time information.

Through this, the types for which printing is permitted can be managed for each instance of time information.

The CPU 200a, the communication circuit 202a, and the condition obtainment unit 805 function as an obtainment unit that obtains the predetermined print permission condition from the server. The CPU 200a may determine whether the predetermined print permission condition obtained by the obtainment unit is satisfied. However, the server is not required, and the print permission condition may be stored in the image forming apparatus 100.

The predetermined print permission condition may be that at least one of a first permission condition and a second permission condition is satisfied. The first permission condition is that the type of the sheet, user attributes, the model of the image forming apparatus, the installation location of the image forming apparatus, or the time information associated with the image forming apparatus belongs to a predetermined range. The second permission condition is that the user wishes to continue the image formation on the sheet. Accordingly, if either condition is satisfied, the user can continue the image formation on a temporary basis, which further improves the usability.

The display device of the operation unit 13 is an example of an output unit that outputs an inquiry to the user as to whether or not to continue the image formation when the first permission condition is not satisfied. The input device of the operation unit 13 is an example of an input unit that accepts an input of a response to the inquiry. The CPU 200a may determine whether the second permission condition is satisfied based on the response.

If, based on the response, the second permission condition is satisfied, the CPU 200a may update the first permission condition. Determining factors for the first permission condition are, for example, the type of the sheet, user attributes, the model of the image forming apparatus, the installation location of the image forming apparatus, or the time information associated with the image forming apparatus. Of these determining factors, factors determined not to satisfy the first permission condition are updated to satisfy the first permission condition thereafter. As a result, image formation is continued without making inquiries to the user thereafter, which further improves the usability.

There are cases where the type of the sheet sensed by the sensing unit does not match the type of the sheet designated in advance, but a predetermined first permission condition is satisfied. In this case, the CPU 200a may permit image formation on the sheet being transported by the transport unit. There are cases where the type of the sheet sensed does not match the type of the sheet designated in advance and the first permission condition is not satisfied, but a predetermined second permission condition is satisfied. In this case, the CPU 200a may permit image formation on the sheet being transported by the transport unit. There are cases where the type of the sheet sensed by the sensing unit does not match the type of the sheet designated in advance, the first permission condition is not satisfied, and the second permission condition is not satisfied. In this case, the CPU 200a may stop image formation on the sheet being transported by the transport unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-166919, filed Oct. 11, 2021 which is hereby incorporated by reference herein in its entirety.

What is claimed is:

1. An image forming system comprising:
an image forming apparatus; and
a server capable of communicating with the image forming apparatus via a network and registering predetermined types of sheets,
wherein the image forming apparatus comprising:
a sheet holder configured to hold a sheet;
a sheet feeder configured to feed the sheet held by the sheet holder;
a sensor arranged on a downstream side of the sheet feeder in a sheet conveying direction and configured to detect a value regarding a property of a surface of the sheet;
an image forming assembly configured to form an image on the sheet fed from the sheet holder;
an input controller configured to input a type of the sheet; and
a display,
wherein, in a case where a type indicated by user designation information for a first sheet in response to input of a print instruction is different from a type corresponding to the value detected by the sensor for the first sheet,
the sheet feeder is further configured to suspend feeding of the first sheet, and
the display is further configured to display a message inquiring whether or not to continue image formation of sheets not registered in the server, and wherein
the image forming assembly is further configured to form an image using an image formation condition based on the type indicated by the user designation information for a first sheet without changing the type indicated by the user designation information for the first sheet in a case where a continuation of the image formation is selected, and the image forming assembly is further configured not to form an image in a case where a continuation of the image formation is not selected.

2. The image forming system according to claim 1, wherein, in a case where the type indicated by the user designation information for the first sheet in response to input of the print instruction and the type corresponding to the value detected by the sensor for the first sheet are identical, the display is further configured not to display the message inquiring whether or not to continue the image formation.

3. The image forming system according to claim 1, wherein the type of the sheet comprises at least one of a cardboard, a glossy paper, an embossed paper, a thin paper, and a standard paper.

4. The image forming system according to claim 1, wherein, in a case where the type of the sheet inputted by the input controller is a standard paper and the type of sheet detected by the sensor is a glossy paper, the display is further configured to display the message inquiring whether or not to continue image formation.

5. The image forming system according to claim 1, wherein the sensor is further configured to detects a value related to a grammage of the sheet and a value related to surface nature of the sheet.

6. The image forming system according to claim 1, wherein, in a case where the image formation is not continued, the display displays a message indicating that the image formation is stopped.

7. The image forming system according to claim 1, wherein, in a case where the image formation is not continued, the display displays a message prompting a user to remove the sheet from inside of the image forming apparatus.

8. An image forming system comprising:

an image forming apparatus; and a server capable of communicating with the image forming apparatus via a network and registering predetermined types of sheets, wherein the image forming apparatus comprising:

a sheet holder configured to hold a sheet;

a sheet feeder configured to feed the sheet held by the sheet holder;

a sensor arranged on a downstream side of the sheet feeder in a sheet conveying direction and configured to detect a value regarding a property of a surface of the sheet;

an image forming assembly configured to form an image on the sheet fed from the sheet holder;

an input controller configure to input a type of the sheet; and a display, wherein, in a case where a type indicated by user designation information for a first sheet in response to input of a print instruction is different from a type corresponding to the value detected by the sensor for the first sheet, the image forming assembly is controlled not to form an image on the sheet, the image forming assembly is further configured to suspend image formation before the image forming assembly completes the image formation, and the display is further configured to display a message inquiring whether or not to continue the image formation of sheets not registered in the server, and wherein the image forming assembly is further configured to form an image using an image formation condition based on the type indicated by the user designation information for a first sheet without changing the type indicated by the user designation information for the first sheet in a case where a continuation of the image formation is selected, and the image forming assembly is further configured not to form an image in a case where a continuation of the image formation is not selected.

9. The image forming system according to claim 8, wherein, in a case where the type indicated by the user designation information for the first sheet in response to input of the print instruction and the type corresponding to the value detected by the sensor for the first sheet are identical, and the display is further configured not to display the message inquiring whether or not to continue the image formation.

10. The image forming system according to claim 8, wherein the type of the sheet comprises at least one of a cardboard, a glossy paper, an embossed paper, a thin paper, and a standard paper.

11. The image forming system according to claim 8, wherein, in a case where the type of the sheet inputted by the input controller is a standard paper and the type of sheet detected by the sensor is a glossy paper, the display is further configured to display the message inquiring whether or not to continue image formation.

12. The image forming system according to claim 8, wherein the sensor is further configured to detects a value related to a grammage of the sheet.

* * * * *